United States Patent
Seki (10) Patent No.: US 9,102,257 B2
(45) Date of Patent: Aug. 11, 2015

(54) CUSHION STRUCTURE FOR VEHICLE SEAT

(75) Inventor: Kunio Seki, Ageo (JP)

(73) Assignee: UD TRUCKS CORPORATION, Ageo (JP)

( * ) Notice: Subject to any disclaimer, the term of this patent is extended or adjusted under 35 U.S.C. 154(b) by 85 days.

(21) Appl. No.: 13/990,868

(22) PCT Filed: Oct. 18, 2011

(86) PCT No.: PCT/JP2011/073905
§ 371 (c)(1),
(2), (4) Date: May 31, 2013

(87) PCT Pub. No.: WO2012/073606
PCT Pub. Date: Jun. 7, 2012

(65) Prior Publication Data
US 2013/0257134 A1    Oct. 3, 2013

(30) Foreign Application Priority Data

Dec. 2, 2010    (JP) .................................. 2010-268971

(51) Int. Cl.
*A47C 7/02*    (2006.01)
*B60N 2/70*    (2006.01)
*B60N 2/72*    (2006.01)

(52) U.S. Cl.
CPC ................ *B60N 2/70* (2013.01); *B60N 2/7076* (2013.01); *B60N 2/72* (2013.01)

(58) Field of Classification Search
USPC ................. 297/284.2, 204, 205, 207, 452.56, 297/452.63
See application file for complete search history.

(56) References Cited

U.S. PATENT DOCUMENTS

| | | | | |
|---|---|---|---|---|
| 5,058,952 A | * | 10/1991 | LaSota | 297/284.2 |
| 5,316,371 A | * | 5/1994 | Bishai | 297/339 |
| 5,544,943 A | * | 8/1996 | Durling | 297/452.56 |
| 5,735,578 A | * | 4/1998 | Penley | 297/440.11 |
| 7,503,627 B2 | * | 3/2009 | Kawasaki | 297/452.56 |

(Continued)

FOREIGN PATENT DOCUMENTS

| | | |
|---|---|---|
| EP | 0 507 644 A1 | 10/1992 |
| FR | 2 891 507 A1 | 4/2007 |

(Continued)

OTHER PUBLICATIONS

Extended European Search Report dated Oct. 1, 2014 in the corresponding European patent application No. 11844844.8-1758.

(Continued)

*Primary Examiner* — Rodney B White
*Assistant Examiner* — Alexander Harrison
(74) *Attorney, Agent, or Firm* — Kratz, Quintos & Hanson, LLP (57) ABSTRACT

The purpose of the present invention is to provide a cushion structure for a vehicle seat, the cushion structure allowing the hardness of the cushion to be adjusted according to an occupant's preference by simple operation. The present cushion structure for a vehicle seat has: a band (41) consisting of a flexible material, the band (41) being provided below the lower surface (1*b*) of a cushion foam and extending in the longitudinal direction of the seat; and a tension adjusting mechanism (5) for adjusting the tension of the band (41) consisting of a flexible material. The tension adjusting mechanism (5) adjusts the hardness of the cushion foam (1) by adjusting the tension of the band (41) consisting of a flexible material.

2 Claims, 6 Drawing Sheets

(56) References Cited

U.S. PATENT DOCUMENTS

| | | | |
|---|---|---|---|
| 7,614,694 B2* | 11/2009 | Forgatsch et al. | 297/284.2 |
| 8,733,836 B2* | 5/2014 | Gross | 297/228.12 |
| 2001/0022458 A1* | 9/2001 | Kuster et al. | 297/284.2 |
| 2003/0193231 A1* | 10/2003 | Fujita et al. | 297/452.56 |
| 2006/0279119 A1* | 12/2006 | Fujita et al. | 297/284.2 |

FOREIGN PATENT DOCUMENTS

| | | |
|---|---|---|
| GB | 2 335 843 A | 10/1999 |
| JP | S58-35 | 1/1983 |
| JP | S58-20927 | 2/1983 |
| JP | S60-90031 | 6/1985 |
| JP | S63-155737 | 10/1988 |
| JP | H1-131349 | 9/1989 |
| JP | 05-245015 | 9/1993 |
| JP | 2001-245746 A1 | 9/2001 |
| JP | 2010-17345 A1 | 1/2010 |
| JP | 2010-208527 A1 | 9/2010 |
| WO | WO 2005/037020 A1 | 4/2005 |

OTHER PUBLICATIONS

International Search Report for International Application No. PCT/JP2011/073905 dated Nov. 15, 2011.

* cited by examiner

CUSHION STRUCTURE FOR VEHICLE SEAT

TECHNICAL FIELD

The present invention relates to a vehicle seat of a truck. More specifically, the present invention relates to a cushion of a vehicle seat.

BACKGROUND ART

Foaming resin is commonly used as material for seat cushion of a vehicle seat.

Hardness and repulsion of cushion foam (so called "seat cushion") will be changed by body weight and preference of the occupants.

As for commercial vehicles used for sales activities, for example, unspecified numbers of drivers often drive the same vehicle and they sometimes argue hardness of the cushion foam.

In this case, if the hardness of the cushion foam can be adjusted, it can not only satisfy the preference of the drivers but also can contribute to decreasing their work loads.

Although hardness of cushion foam made from foaming resin can be adjusted by the foam size and the foaming ratio, its hardness cannot be adjusted once the cushion foam is formed.

Figure 11:
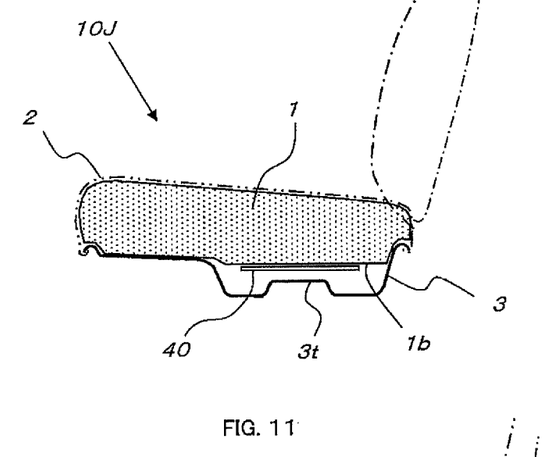

FIG. 11 is the sectional view of a seat cushion 10J which is an example of one of the possible structures to adjust the hardness of the cushion foam.

FIG. 11 shows the seat cushion 10J which comprises a cushion foam 1, a cushion trim cover 2 and a cushion pan 3. Also, there is a rigid plate member 40 below the lower surface 1b of the cushion foam 1.

This plate member 40, for example, suppresses shape change of the lower surface 1b of the cushion foam 1 when the occupant bounces while seated, so as to adjust the hardness of the cushion foam indirectly.

Figure 12:
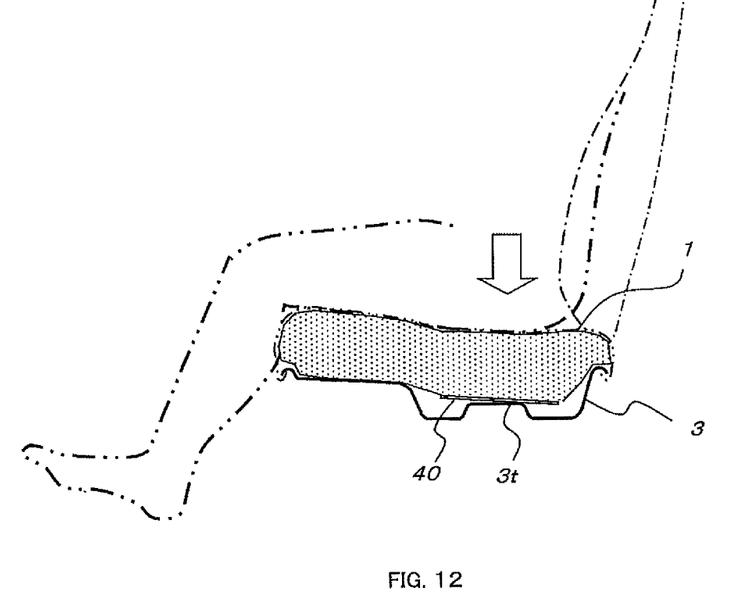

Since the shape of the plate member 40 cannot follow the irregularity at the reinforcing rib 3t of the cushion pan 3 in the structure shown in FIG. 11, the plate member 40 is inclined as shown in FIG. 12.

The cushion foam 1, therefore, may be set in an inclined state.

Moreover, since abnormal sound is heard every time the rigid plate member 40 contacts with the (reinforcing rib 3t of the) steel cushion pan 3, it may give discomfort to the seated occupant of the vehicle.

As for another prior art, an invention is proposed to make a cavity in the cushion and a movable plate is provided in the cavity to adjust the cushion foam (refer to the Patent Literature 1).

This prior art, however, is intended for the hardness adjustment of the cushions of furniture chairs and cannot be applied to the cushions of vehicle seats.

CITATION LIST

Patent Literature

Patent Literature 1: Japanese Patent Application Non-examined Publication Gazette No. 2001-245746

SUMMARY OF INVENTION

Technical Problem

The present invention was proposed to overcome the problems of the prior art, and a purpose the present invention is to provide a cushion structure for a vehicle seat, the cushion structure allowing the hardness of the cushion to be adjusted according to an occupant's preference by simple operation.

Solution to Problem

The cushion structure for a vehicle of the present invention is characterized in that the cushion structure comprises a band (41: for example, fabric band) consisting of a flexible material, the band (41) being provided the lower surface (1b) of a cushion foam in below side and extending in the longitudinal direction of the seat and a tension adjusting mechanism (5) for adjusting the tension of the band (41) consisting of a flexible material; and the tension adjusting mechanism (5) carries out a function for adjusting the hardness of the cushion foam (1) by adjusting the tension of the band (41) consisting of a flexible material;

band pass holes (3o) are formed in the cushion pan (3), through the band pass hole (3o), the plurality (two, for example) of the band (41) consisting of a flexible material extends in parallel in longitudinal direction of the seat from the band tension adjusting mechanism (5) to the seat rear end;

the band (41) consists of a flexible material which extends in parallel in plural numbers in longitudinal direction of the seat is connected to the connection band (45) consisting of a flexible material which extends orthogonally to the longitudinal direction of the seat; and that the tension adjusting mechanism (5) includes rotation devices (54, 55) and the movement devices (51~53) connected to the rotation devices (54, 55), and the movement devices (51~53) carry out a function for moving in the longitudinal direction of the seat and are connected to the band (41) consisting of a flexible material which extends in longitudinal direction of the seat.

Advantageous Effects of Invention

In the present invention comprising the above-mentioned constructions, since there is the band (41: for example, fabric band) consisting of a flexible material which extends in longitudinal direction of the seat is provided below the lower surface (1b) of the cushion foam and the tension adjusting mechanism (5) for adjusting the tension of the band (41), if the tension of the band (41) consisting of a flexible material is increased, the present invention can carry out an effect being similar to an effect in a case that the cushion foam (1) is hardened by tuning of the foaming ratio.

Also, if the tension of the band (41) consisting of a flexible material is decreased, it gives the similar effect of softening the cushion foam (1) by tuning of the foaming ratio.

Apart from tuning of the foaming ratio, the tension of the band (41) consisting of a flexible material can be adjusted freely as any times as desired.

Since the vehicle cushion structure of the present invention includes the band (41) consisting of a flexible material, it is possible to follow the irregularity on the cushion pan (3) below the cushion (1b). For example, if the band (41) consisting of a flexible material is in the loosest state, it can be placed as it is on the irregular surface (3t) of the cushion pan (3).

However, if the member to be placed below the lower surface (1b) of the cushion is a rigid plate member, it does not follow the irregularity of the cushion pan (3) and it will be inclined due to the irregularity (3t). In this case, the cushion foam (1) may be placed in a slanted state.

Moreover, since abnormal sound is heard every time the rigid plate member (40) collides with the cushion pan (3), it may give discomfort to the seated occupant of the vehicle.

With the vehicle cushion structure of the present invention, this disadvantage may be dissolved by using the band (41) consisting of a flexible material.

Here, if the width of the band (41) consisting of a flexible material is too small, the portion, whose deflection is suppressed by the band (41) consisting of a flexible material, may locally contact the backside of the occupant, which may cause pain in the backside being contacted with the portion.

If, on the other hand, the width of the band (41) consisting of a flexible material is too large, the width of the pass hole (3o) for the band (41) consisting of a flexible material to pass through the cushion pan (3) will become too large, and therefore, the cushion pan (3) strength will be decreased.

In the present invention, there are plurality of the bands (41) consisting of a flexible material extending in parallel in longitudinal direction of the seat, and also, these plurality of the bands (41) consisting of a flexible material extending in parallel are connected by the connection band (45) consisting of a flexible material and extending orthogonally to the longitudinal direction of the seat.

By means of these constructions, the band (41) consisting of a flexible material and extending in the longitudinal direction of the seat and the connection band (45) consisting of a flexible material distribute the total deflection of the cushion foam (1) evenly. Therefore, it distributes the reaction force acting on the backside evenly and suppresses the local action on the backside with a relative large pressure (such the local action made the occupant to be discomfort).

In addition, since the tension adjusting mechanism (5) includes rotation devices (54, 55), the seated occupant can adjust the tension of the band (41) consisting of a flexible material by turning the rotation device (55) by hand and shifting the movement devices (51~53) in longitudinal direction of the seat.

DESCRIPTION OF EMBODIMENTS

The first embodiment of the present invention is explained below in reference with the FIG. 1 to FIG. 7.

Figure 1:
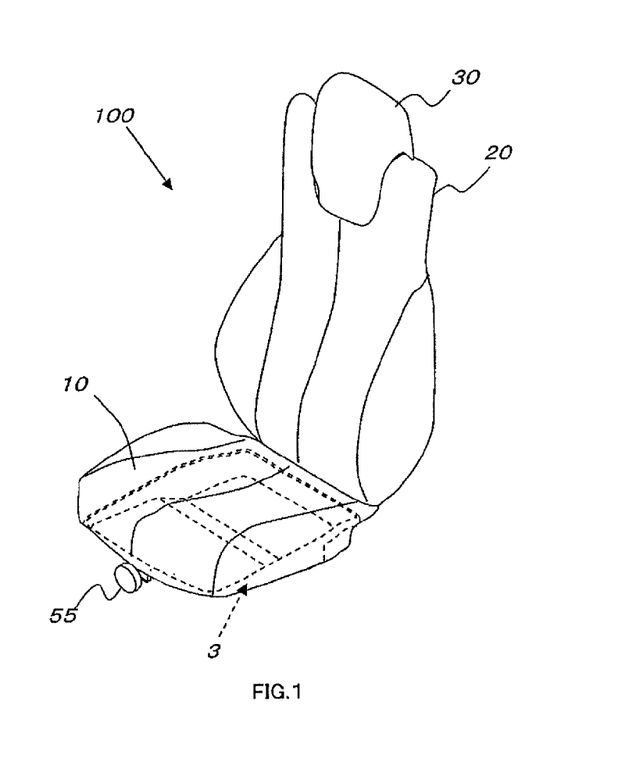
FIG. 1 Perspective view of the vehicle seat with the vehicle cushion seat mechanism on board of the first embodiment of the present invention FIG. 2 Sectional view of the cushion mechanism of the first embodiment FIG. 3 Perspective view of an upper side of an important portion showing the cushion mechanism of the first embodiment FIG. 4 Perspective view of a lower side of an important portion showing the cushion mechanism of the first embodiment FIG. 5 Plain view of the tension adjusting mechanism of the first embodiment FIG. 6 Explanations drawing of the range of pass hole size in the cushion pan of the first embodiment FIG. 7 Explanations drawing for showing the state of the increased hardness of the seat cushion mechanism of the first embodiment FIG. 8 Explanations drawing for showing the state of the decreased hardness of the seat cushion mechanism of the first embodiment FIG. 9 Plain view of the tension adjusting mechanism of the second embodiment FIG. 10 Plain view of the tension adjusting mechanism of the third embodiment FIG. 11 Sectional view of the cushion hardness adjusting mechanism of the prior art FIG. 12 Explanations drawing of the prior art shown in FIG. 11.

FIG. 1 shows a vehicle seat 100 with a vehicle seat cushion mechanism (referred to as "seat cushion" hereinafter) 10 in the first embodiment.

In FIG. 1, the vehicle seat 100 comprises the seat cushion 10, a seat back 20 and a pillow 30.

Character 3 in FIG. 1 shows the cushion pan of the seat cushion 10. Character 55 shows an adjusting dial of the tension adjusting mechanism 5 to be described later.

Figure 2:
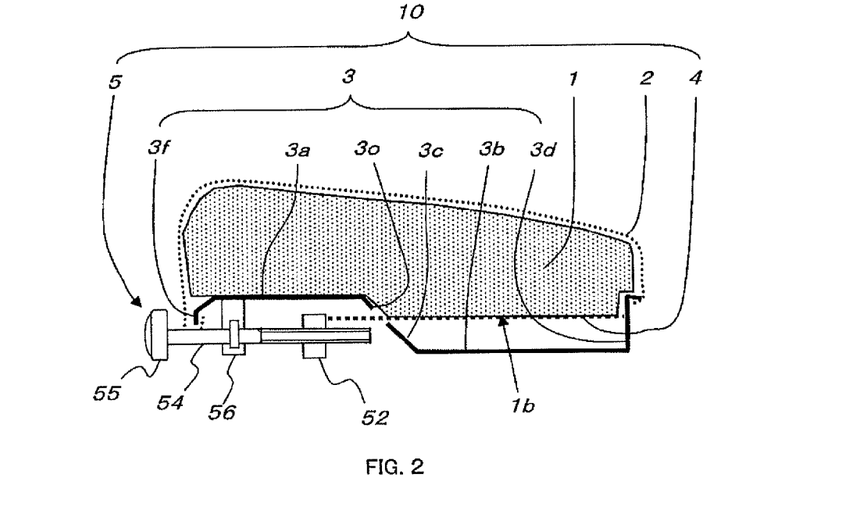

In FIG. 2, the seat cushion 10 comprises the cushion foam 1, a cushion trim cover 2, the cushion pan 3 and the band member 4 consisting of a flexible material (referred to as "flexible band" hereinafter) and the tension adjusting mechanism 5.

The cushion foam 1, for example, hard foaming urethane is used to be formed in the shape of the vehicle seat.

In the examples shown by the drawings, the cushion trim cover 2 entirely covers the cushion foam 1 and the edge of the cover is hooked to the outer edge of the cushion pan 3.

Figure 3:
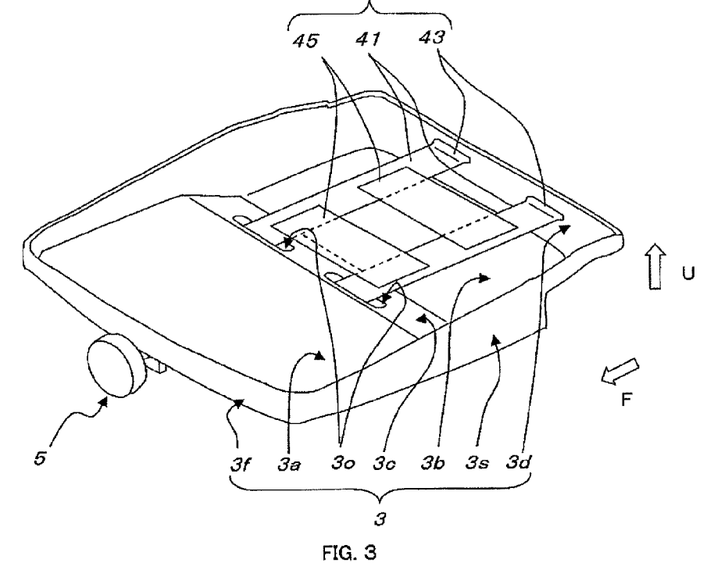
Figure 4:
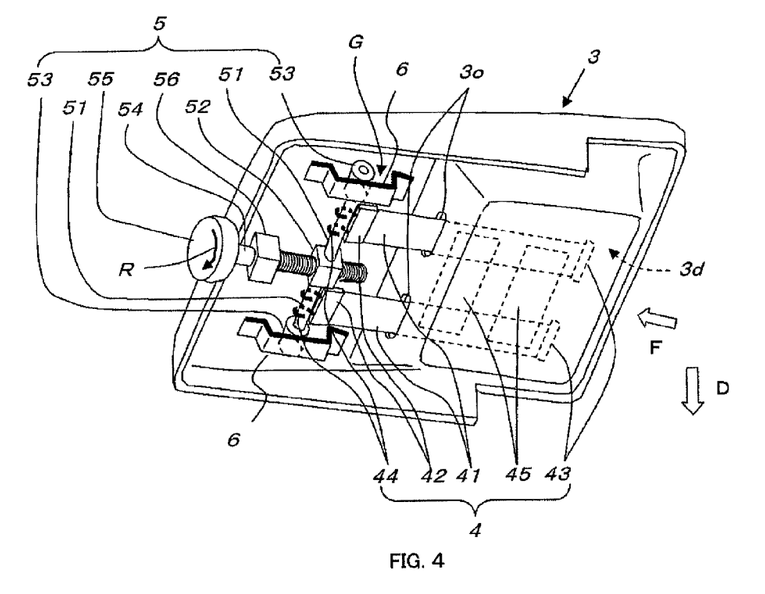

FIG. 3 is an perspective view of the cushion pan 3. In FIG. 3, an arrow F indicates the forward direction and an arrow U indicates the upward direction. FIG. 4 is an perspective view of the cushion pan 3. In FIG. 4, an arrow F indicates the upper direction and an arrow D indicates the down direction.

In FIG. 2 to FIG. 4, the cushion pan 3 comprises a forward edge 3f, a forward bottom 3a, a backward bottom 3b, a slope 3c, a backward edge 3d and a side edge 3s.

The forward bottom 3a and the backward bottom 3b are connected successively through the slope 3c, an d the slope has two slits 3o.

In FIG. 3 and FIG. 4, the flexible band 4 has two band bodies 41 and two cross bands 45. Two band bodies 41 and two cross bands 45 intersect in a cross way (in a sharp "#" shape as the band as a whole) and are restricted each other at the crossing points.

A forward edge member 42 is fixed to the forward edge of the band body 41. A forward edge connection member 42 connects the band body 41 and the two hooks 44. A backward connection part 43 of the band body 41 is fixed to the backward edge 3d of the cushion pan 3.

The two band bodies 41 pass through the slits 3o formed in the cushion pan 3.

The band forward edge hook 44 is engaged with a hook support rod 51 of the tension adjusting mechanism 5. The band forward edge hook 44 will be described later.

Figure 5:
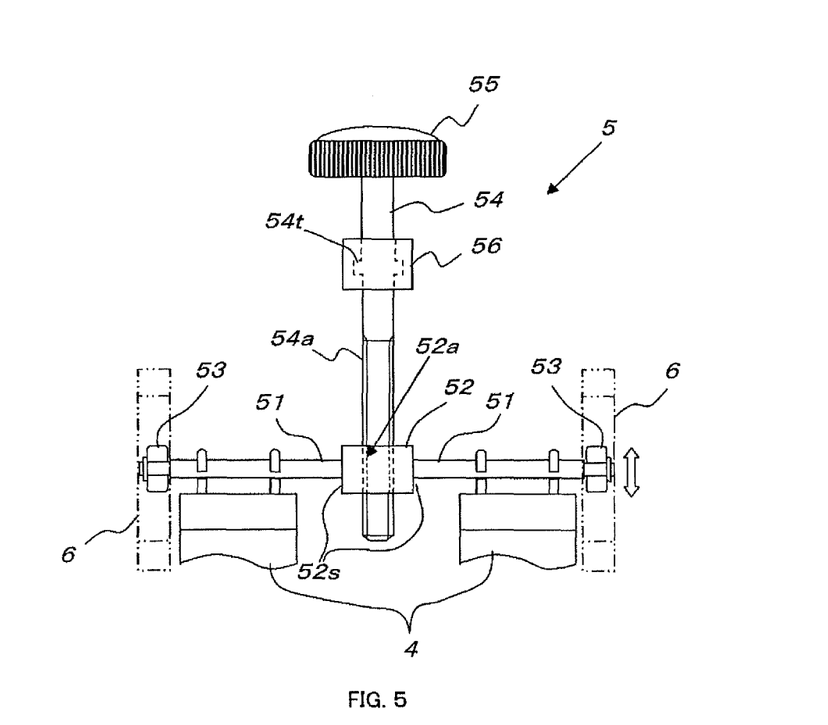

In FIG. 4 and FIG. 5, the tension adjusting mechanism 5 comprises a pair of hook support rods 51, a female screw member 52, a pair of rollers 53, an adjustment rod 54, an adjusting dial 55 and a rod support member 56.

A pair of hook support rods 51 are fixed to the both sides 52s of the female screw member 52 respectively, so as to make the hook support rods 51 form a straight line (refer to FIG. 5).

A female screw member 52a formed in the female screw member 52 extends in the orthogonal direction of the pair of hook support rods 51.

Each of rollers 53 is attached to the both sides of the pair of the hook support rods 51 respectively and is attached to the hook support rod 51 so as to make the roller 53 to be able to rotate freely.

A pair of rollers 53 are constructed so as to rotate in guide paths G without free movement (rattling), which paths are constructed by a pair of guide members 6 being fixed to the back side of the forward bottom 3a of the cushion pan 3 and the back side of the forward bottom 3a (Refer to FIG. 4).

An adjusting dial 55 is fixed at a front tip of an adjustment rod 54 and a male screw 54a is formed in a range extending from the center to the end tip of the rod 54.

In the portion where male screw 54a is not formed, a convex part 54t is formed.

A rod support member 56 is fixed at the back side of the forward bottom 3a of the cushion pan 3 and is fixed in the center of width direction of near the front tip.

Although it is not shown clearly, in the rod support member 56, a space of complementary form to the convex part 54t of the adjustment rod 54 is formed.

The convex part 54t of the adjustment rod 54 is engaged to the space of the rod support member 56 and is supported so as to allow free rotation.

In FIG. 4, when the adjusting dial 55 is turned clockwise (in the direction of arrow R), the female screw member 52 tries to move forward (in the direction of arrow F).

Then, since the hook support rod 51, which is combined with the female screw member 52, will be moved forward (in the direction of arrow F), the tension of the band body 41 being engaged with the pair of hook supporting rods 51 is increased.

In other words, by increasing the tension of the band body 41, it will operate the same effect of increasing the cushion foam hardness by tuning the foaming ratio of the cushion foam material.

Figure 6:
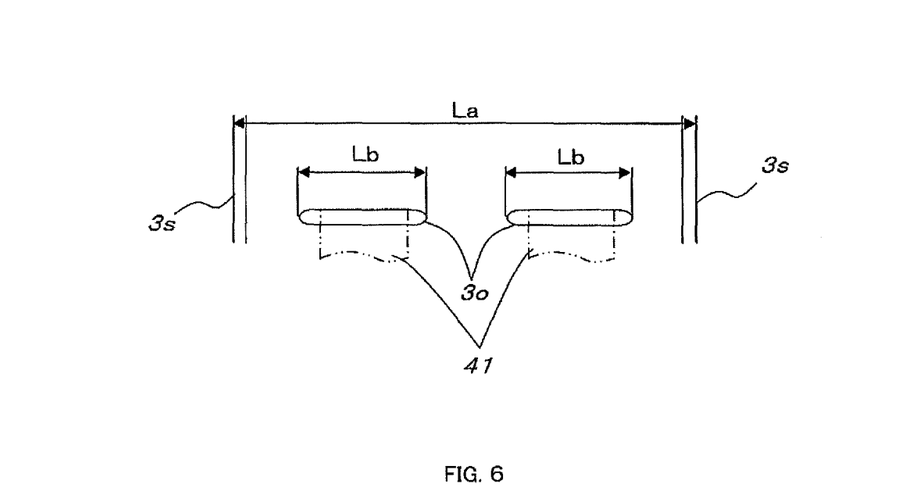

FIG. 6 shows a band pass slit 3o. The band body 41 of the band consisting of a flexible material 4 will be inserted into the band pass slit 3o. Also, two band pass slits 3o are made on the slope 3c of the cushion pan 3.

Character 3s in FIG. 6 indicates the side edge of the cushion pan 3.

The length of width Lb of the band pass slit 3o formed in the cushion pan 3 should be set in the range below.

$$0.1La \leq Lb \leq 0.3La$$

Where, character La represents the length of the cushion pan 3 in the width direction.

In the above-mentioned mathematical expression, Lb=0.1 La is the limit value with which the seated occupant does not feel discomfort, and the limit value of the narrow side of the band 41.

Lb=0.3 La is the limit value with which the strength of the cushion pan 3 is assured and the limit value with which the problem of strength of the cushion pan 3 is not generated.

Figure 7:
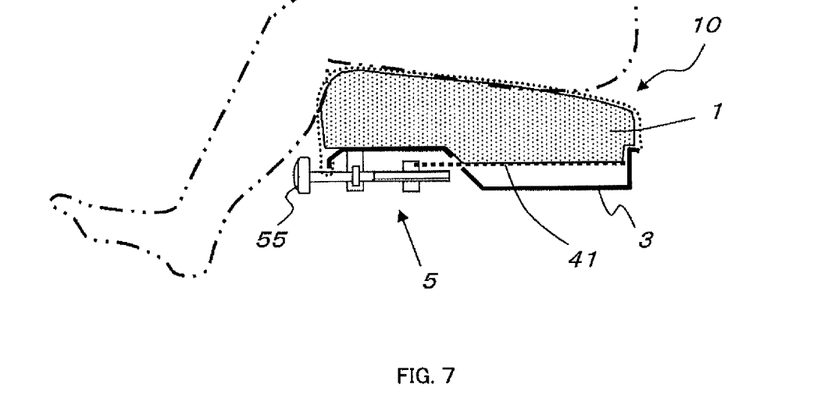

FIG. 7 shows the seat cushion 10 of the first embodiment in a situation that the hardness of the seat cushion 10 is increased. FIG. 7 shows the situation, for example, when the occupant has just seated and the vehicle is still in the stationary state.

In the situation shown in FIG. 7, the tension acted on the band 4 consisting of a flexible material (the band body 41) is strong and the band 4 is not deflected generally.

Figure 8:
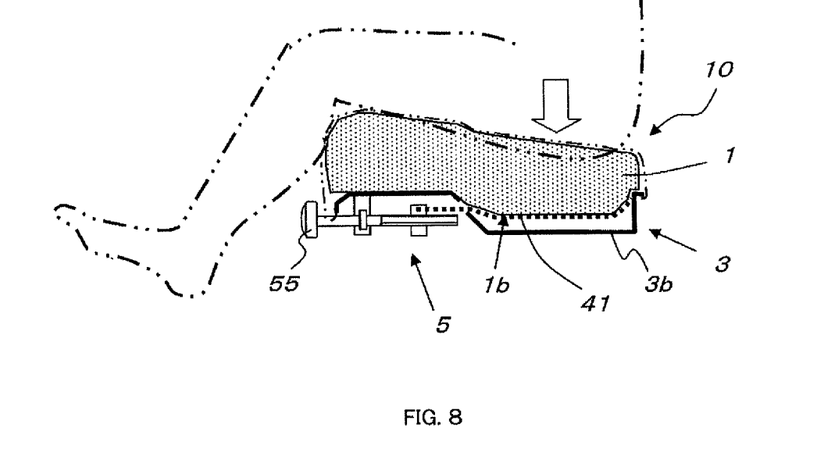

FIG. 8 shows the situation that the hardness of the cushion seat 10 is decreased by operating (turning) the adjusting dial 55 of the seat cushion 10 shown in FIG. 7.

Or, it shows the bounding situation of the vehicle in a manner that the hardness of the cushion seat 10 is decreased.

In the situation shown in FIG. 8, the tension acted on the band consisting of a flexible material (band body 41) which supports the bottom 1b of the cushion foam 1 is small, and the cushion foam 1 and the band 4 deflect downward.

In the state shown in FIG. 8, for example, even if a reinforcing bead (refer to character 3t shown in FIG. 11) is formed at the rear bottom 3b of the cushion pan 3, the band 4 consisting of a flexible material (band body 41) will deform along with the reinforcing bead.

According to the first embodiment shown in the drawings, by comprising the band body 41 and increasing the tension acted on the band body 41, the first embodiment can carry out the same effect as increasing the hardness of the cushion foam 1 by adjusting the foaming ratio of the cushion foam 1.

On the other hand, if the tension acted on the band body 41 is decreased, the first embodiment can carry out the same effect as decreasing the hardness of the cushion foam 1 by adjusting the foaming ratio of the cushion foam 1.

Differ to adjusting the foaming ratio of the cushion foam 1, according to the first embodiment shown in the drawings, the tension of the band body 41 can be freely adjusted as any times as an occupant wishes.

Since the vehicle cushion structure of the first embodiment uses the band 41 consisting of a flexible material, the band 4 (band body 41) can follow the irregularity (rib 3t made on the rear bottom: refer to FIG. 11) on the steel cushion pan 3. For example, if the band 41 consisting of a flexible material is in the loosest state, the band 4 can be placed as it is on the rib of the cushion pan 3.

On the contrary, by means of the prior art shown in FIG. 11 and FIG. 12, if the member to be placed on the lower surface 1b of the cushion form is a rigid plate member, it does not follow the rib of the cushion pan and it will be inclined due to the rib, and therefore, in this case, it is possible that the cushion foam 1 may be placed in a inclined state.

In addition, by means of the prior art shown in FIG. 11 and FIG. 12, since abnormal sound is heard every time the rigid plate member contacts with the cushion pan 3, it is possible for the seated occupant in the vehicle to be sensed discomfort.

In the cushion structure of the first embodiment, by using the band 41 consisting of a flexible material, the above-mentioned disadvantage may be dissolved.

Here, if the width of the band 41 consisting of a flexible material is too small, the portion, whose deflection is inhibited by the band 41 consisting of a flexible material, may locally hit the backside of the occupant, and then, pain in the backside touched by the portion is generated.

On the other hand, if the width of the band 41 consisting of a flexible material is too large, the width of the pass hole 3o for the band 41 consisting of a flexible material (the width of the pass hole 3o through which the band body 41 is passing) in the cushion pan 3 will become too large, and therefore, the cushion pan 3 strength is decreased.

In the first embodiment, there are the plurality of band bodies 41 extending in parallel in longitudinal direction of the seat and the connection band 45, and the plurality of band bodies 41 are connected by the connection band 45 consisting of a flexible material and extending orthogonally to the longitudinal direction of the seat.

With the band 41 and the connection band 45, total deflections of the cushion foam 1 are uniformed. Therefore, reaction forces acted on the backside are distributed equally, then, it is inhibited that the large pressure is acted to the occupant's backside locally and that the occupant feel discomfort.

Figure 9:
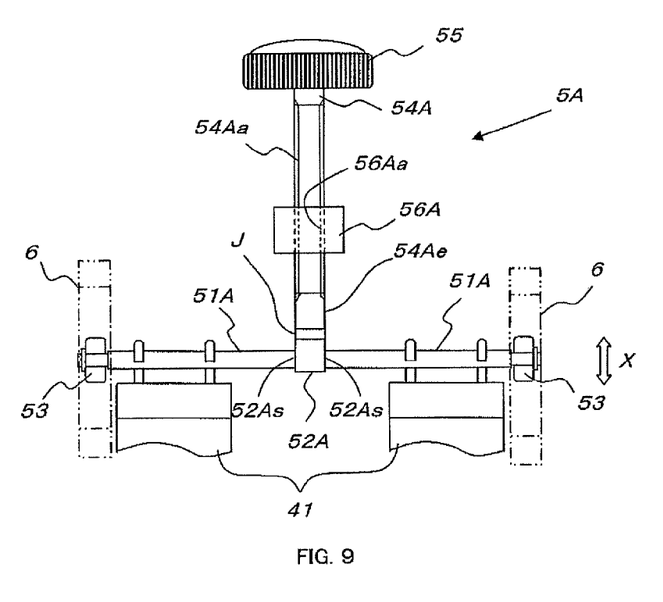

Next, referring to FIG. 9, the second embodiment is explained.

The seat cushion structure of the second embodiment shown in FIG. 9 comprised another tension adjusting mechanism which is different from that of the first embodiment cushion structure.

A tension adjustment structure 5A in the second embodiment comprise no female screw member 52 in the tension adjusting mechanism 5 of the first embodiment, however, in the second embodiment, there are a pair of hook support rods 51A being connected with a rear end 54Ae of a rod 54A with a universal joint J.

A pair of hook support rods 51A are attached to both sides 52As of a central connection member 52A symmetrical in lateral direction.

At both sides of a pair of support rods 51A, rollers 53 are rotatably supported, as the same manner in the first embodiment.

As mentioned above, the central connection member 52A of the hook support rod 51A is connected to a rear end 54Ae of an adjustment rod 54A by the universal joint J.

A male screw 54Aa is formed in a center of an adjustment rod 54A, and a male screw 54Aa is constructed to be engaged with a female screw 56Aa formed in a rod support member 56A.

The rod support member 56A is fixed at the back side of the front bottom 3a of the cushion pan 3.

Therefore, it is so constructed that when an adjusting dial 55 at the front end of the adjustment rod 54A is turned, the adjustment rod 54A itself moves in the front-back direction (direction of arrow X) of the seat.

Rollers 53 supported at the both end of the hook supporting rod 51A are restricted movements in vertical direction (in direction perpendicular to the plane of the paper of FIG. 9) by a guide member 6 and a guide path G (refer to FIG. 4). The guide path G is defined by the back side of the rear bottom 3a of the cushion pan 3.

When the adjustment rod 54A is rotated by turning of the adjusting dial 55, the hook support rod 51A does not rotate and a pair of the hook support rods 51A then move in the front-back direction (movement in direction of arrow X).

Hence, the band 4 consisting of a flexible material (band body 41), which is supported by the pair of hook support rods 51A, moves in the front-back direction (direction of Arrow X) of the seat.

The another constructions of the second embodiment are the substantially same as those of the first embodiment and the functional effects thereof are also the same as those of the first embodiment.

Next, the third embodiment is explained below based on FIG. 10.

Figure 10:
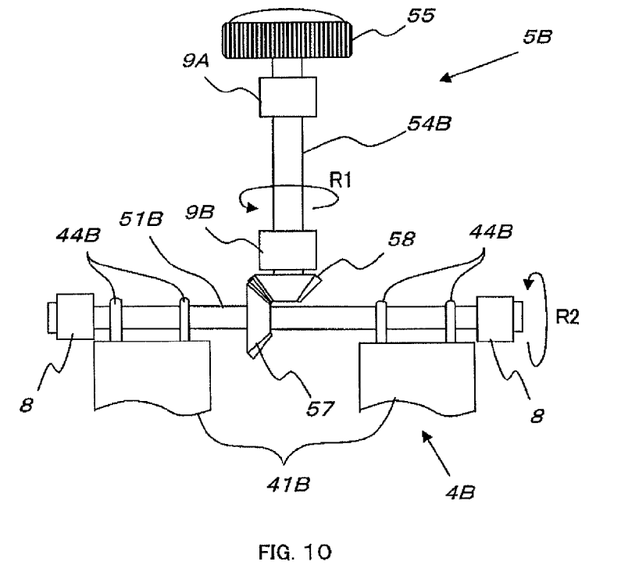

The seat cushion structure of the third embodiment in FIG. 10 differs from the first and second embodiments in the tension adjusting mechanism and the belt structure.

In FIG. 10, a tension adjustment structure 5B of the third embodiment comprises a hook support rod 51B and an adjustment rod 54B.

In a substantially central position of a hook support rod 51B (the substantially central position in a left-right direction shown in FIG. 10), a first bevel gear 57 is fixed. A connection members 44B are engaged to the hook support rod 51B in a range which is near a member 8 than the first bevel gear 57 (a range being left and right side of the gear 57 in FIG. 10). Two pairs of connection members 44B are provided at a tip of a band body 41B in a band 4B consisting of a flexible material.

Both sides of the hook support rod 51B are supported to the back side of the front bottom 3a of the cushion pan 3B by a pair of bearings.

To the adjustment rod 54B, an adjusting dial 55 is fixed at the front end (upper end in FIG. 10) and a second bevel gear 58 is fixed at the rear end (lower end in FIG. 10), the second bevel gear 58 is engaged with the first bevel gear 57 of the hook support rod 51B.

The adjustment rod 54B is rotatably supported at near portions of front and back ends (right and left ends in FIG. 10) by a pair of bearing members 9A, 9B.

The bearing member 9A comprises a latch mechanism, which is not shown in the drawings, the latch mechanism has a function for inhibiting a rotation (for example, clockwise rotation) by operating a stopper being not shown in the drawings. Also, the bearing member 9B comprises the latch mechanism being not shown in the drawings, which mechanism should have a function for inhibiting a rotation (for example, counterclockwise rotation) by operating a stopper being not shown in the drawings, as a necessary condition.

If this additional mechanism does not exist, when the tension of the band 4B consisting of a flexible material is increased, due to the tension, the hook support rod 51B rotates in the direction that the tension of the band 4B is decreased.

In the third embodiment shown in FIG. 10, when the adjusting dial 55 is turned in the direction of arrow R1, the hook support rod 51B turns in the direction of arrow R2. Then, the band body 41B is wound up by the hook support rod 51B and the tension of the band 4B consisting of a flexible material (band body 41) is increased.

On the other hand, if the adjusting dial 55 is turned in reverse direction, the tension of the band 4B consisting of a flexible material (band body 41) is decreased.

The constructions and the functional effects of the third embodiment, which are not mentioned above, are the same as that of the first embodiment.

The embodiments shown in the drawings are merely examples and are not intended to restrict the technical scope of the present invention.

EXPLANATION OF CHARACTERS 1 cushion foam
2 cushion trim cover
3 cushion pan
4 band member consisting of a flexible material/band consisting of a flexible material
5 tension adjusting mechanism
6 guide member
8 bearing member
9A, 9B bearing member

The invention claimed is:

1. A cushion structure for a vehicle seat, disposed below the underside of a cushion foam, comprising:
a plurality of bands consisting of a flexible material extending in the longitudinal direction of the seat;
a cushion pan including band pass holes; and
a tension adjusting mechanism for adjusting the tension of the plurality of bands,
wherein the tension adjusting mechanism carries out a function for adjusting the hardness of the cushion foam by adjusting the tension of the plurality of bands,
wherein the plurality of bands consist of a flexible material extend in parallel in the longitudinal direction of the seat through the band pass holes from the band tension adjusting mechanism to the rear end of the seat,
wherein the plurality of flexible bands is connected with a plurality of connecting flexible bands which extends in the orthogonal direction to the longitudinal direction of the cushion seat, and
wherein the tension adjusting mechanism includes a movement mechanism being connected with a rotation device and a movement device connected to the rotation device, which movement mechanism carries out a function for movement in the longitudinal direction of the seat and connected to the band consisting of a flexible material extending in the longitudinal direction of the seat.

2. The cushion structure for a vehicle seat of claim 1, wherein the width of the band pass holes (Lb) relative to the width of the cushion pan (La) satisfy the following relation: $0.1\ La \leq Lb \leq 0.3\ La$.

\* \* \* \* \*